United States Patent
Zeng et al.

(10) Patent No.: US 8,527,952 B2
(45) Date of Patent: Sep. 3, 2013

(54) TEST COVERAGE ANALYSIS METHOD AND APPARATUS

(75) Inventors: Chun Guang Zeng, Beijing (CN); Zhi Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/547,262

(22) Filed: Aug. 25, 2009

(65) Prior Publication Data

US 2010/0058300 A1    Mar. 4, 2010

(30) Foreign Application Priority Data

Aug. 26, 2008  (CN) .......................... 2008 1 0212446

(51) Int. Cl.
*G06F 9/44* (2006.01)

(52) U.S. Cl.
USPC ........... 717/124; 717/127; 717/131; 717/133; 707/698; 707/754

(58) Field of Classification Search
USPC ........................................................ 717/124
See application file for complete search history.

(56) References Cited

U.S. PATENT DOCUMENTS

| | | | | |
|---|---|---|---|---|
| 5,918,037 | A * | 6/1999 | Tremblay et al. | 716/132 |
| 6,002,869 | A * | 12/1999 | Hinckley | 717/124 |
| 6,550,057 | B1 * | 4/2003 | Bowman-Amuah | 717/126 |
| 6,721,941 | B1 * | 4/2004 | Morshed et al. | 717/127 |
| 6,760,903 | B1 * | 7/2004 | Morshed et al. | 717/130 |
| 6,907,546 | B1 * | 6/2005 | Haswell et al. | 714/38.11 |
| 7,100,195 | B1 * | 8/2006 | Underwood | 726/2 |
| 7,284,274 | B1 * | 10/2007 | Walls et al. | 726/25 |
| 7,299,224 | B2 * | 11/2007 | Doerre et al. | 707/722 |
| 7,430,670 | B1 * | 9/2008 | Horning et al. | 713/190 |
| 7,519,956 | B2 * | 4/2009 | Fukuda et al. | 717/125 |
| 7,765,525 | B1 * | 7/2010 | Davidson et al. | 717/124 |
| 7,788,270 | B2 * | 8/2010 | Bernard | 707/754 |
| 7,861,226 | B1 * | 12/2010 | Episkopos et al. | 717/124 |
| 7,886,272 | B1 * | 2/2011 | Episkopos et al. | 717/124 |
| 7,945,898 | B1 * | 5/2011 | Episkopos et al. | 717/124 |
| 2001/0037356 | A1 * | 11/2001 | White et al. | 709/201 |
| 2001/0047436 | A1 * | 11/2001 | Sexton et al. | 709/316 |
| 2003/0066055 | A1 * | 4/2003 | Spivey | 717/131 |
| 2003/0088854 | A1 * | 5/2003 | Wygodny et al. | 717/130 |
| 2005/0210439 | A1 * | 9/2005 | Dimpsey et al. | 717/100 |
| 2005/0257086 | A1 * | 11/2005 | Triou et al. | 714/25 |
| 2006/0184918 | A1 * | 8/2006 | Rosaria et al. | 717/124 |
| 2006/0242627 | A1 * | 10/2006 | Wygodny et al. | 717/128 |
| 2008/0209404 | A1 * | 8/2008 | Brady | 717/128 |
| 2009/0070746 | A1 * | 3/2009 | Dhurjati et al. | 717/128 |

(Continued)

OTHER PUBLICATIONS

Title: Testing Coverage Analysis for Software Component Validation, author: Gao et al, source: IEEE, dated:2005.*

(Continued)

*Primary Examiner* — Chameli Das

(74) *Attorney, Agent, or Firm* — Cuenot, Forsythe & Kim, LLC

(57) ABSTRACT

A test coverage analysis method and corresponding apparatus are disclosed, wherein, by executing the program under test using one or more test cases, generating one or more heapdump files containing the call stack information of the program under test, and analyzing the call stack information in the one or more heapdump files, the coverage information of the one or more test cases in terms of functions in the program under test is obtained.

7 Claims, 4 Drawing Sheets

(56) References Cited

U.S. PATENT DOCUMENTS

| | | | |
|---|---|---|---|
| 2009/0125976 A1* | 5/2009 | Wassermann et al. | 726/1 |
| 2009/0307251 A1* | 12/2009 | Heller et al. | 707/101 |
| 2010/0192133 A1* | 7/2010 | Brady | 717/128 |
| 2011/0302422 A1* | 12/2011 | Farrugia et al. | 713/181 |
| 2012/0191716 A1* | 7/2012 | Omoigui | 707/740 |

OTHER PUBLICATIONS

Title: Test coverage analysis based on program slicing, author: Zhenqiang Chen et al, source: IEEE, dated: 2003.*

"Java2 Platform, Standard Edition 5.0, Trouble-Shooting and Diagnostic Guide", Sun Microsystems, Santa Clara CA, 2006.

"IBM Developer Kit and Runtime Environment, Java 2 Technology Edition, Version 1.3.1, Diagnostics Guide", IBM Corporation, Armonk NY, Dec. 2007.

"IBM Developer Kit for z/OS, Java2 Technology Edition, Persistent Reusable Java Virtual Machine User's Guide, Version 1 Release 4.2", IBM Corporation, Armonk NY, Jan. 2008).

Software Test & Performance, vol. 4, Issue 4, Apr. 2007.

* cited by examiner

TEST COVERAGE ANALYSIS METHOD AND APPARATUS

TECHNICAL FIELD

The invention relates to the computer field, especially to the software testing field, and more specifically to a test coverage analysis method and apparatus.

TECHNICAL BACKGROUND

For big software vendors, the quantity of test cases or test programs is usually huge, and will accumulate following every update release of the product. For example, IBM Content Manager has more than 2000 JAVA function test cases developed successively during over 6 years. For guaranteeing the testing quality and designing new test cases, it is very important to learn the coverage of these test cases, that is, which functions of the tested software program have been called by the test cases. However, such a coverage analysis is hard work because of the huge quantity of test cases.

At present, there are several tools which can be used for coverage analysis, but each of them has their own weakness.

Existing heap analyzer tools mainly focus on analyzing memory usage, instead of coverage analysis. Although it is possible to obtain functional coverage information from such tools, they do not report such information directly. Also using such tools can only analyze one heapdump at a time, and cannot analyze multiple heapdumps created by multiple test cases at the same time.

Existing testing analysis tools have special functions for coverage analysis, however, such functions are normally realized by instrumentation, which needs to obtain and modify the source code of the program under test and requires the program under test to execute under the tool's own execution environment, so as to bring about extra costs of purchase, installation, studying and using. Besides, such tools can also only analyze one test case at a time, and cannot perform coverage analysis on the execution results of multiple test cases collectively after executing these test cases.

Apparently, in the field there is a need for an effective coverage analysis solution which can perform coverage analysis on the execution results of multiple test cases at the same time, without requiring the test cases to run in a particular tool's execution environment.

SUMMARY OF THE INVENTION

In one aspect of the invention, there is provided a test coverage analysis method comprising: generating one or more heapdump files containing the call stack information of the program under test through using one or more test cases to execute the program under test; and analyzing the call stack information in the one or more heapdump files to obtain the coverage of the one or more test cases in terms of functions in the program under test.

In another aspect of the invention, there is provided a test coverage analysis apparatus comprising: a heapdump generating module configured to generate one or more heapdump files containing the call stack information of the program under test through using one or more test cases to execute the program under test; and an analysis module, configured to analyze the call stack information in the one or more heapdump files to obtain the coverage of the one or more test cases in terms of functions of the program under test.

The solution of the invention not only effectively accomplishes coverage analysis on test cases, but also only relies on the execution results of the program under test executing under the testing environment, without needing the source code of the program under test and to run the program under test in a special environment. Moreover, the technical solution of the invention can achieve analyzing the coverage of a test case set containing a large amount of test cases at one time.

BRIEF DESCRIPTION OF THE DRAWINGS

The attached claims set forth the creative features believed to be characteristic of the invention. However, the invention itself and its preferred mode of use, object, features and advantages can be better understood by referring to the following detailed description of the illustrative embodiments when read in conjunction with the drawings, in which:

DETAILED DESCRIPTION OF EMBODIMENT OF THE INVENTION

Figure 1:
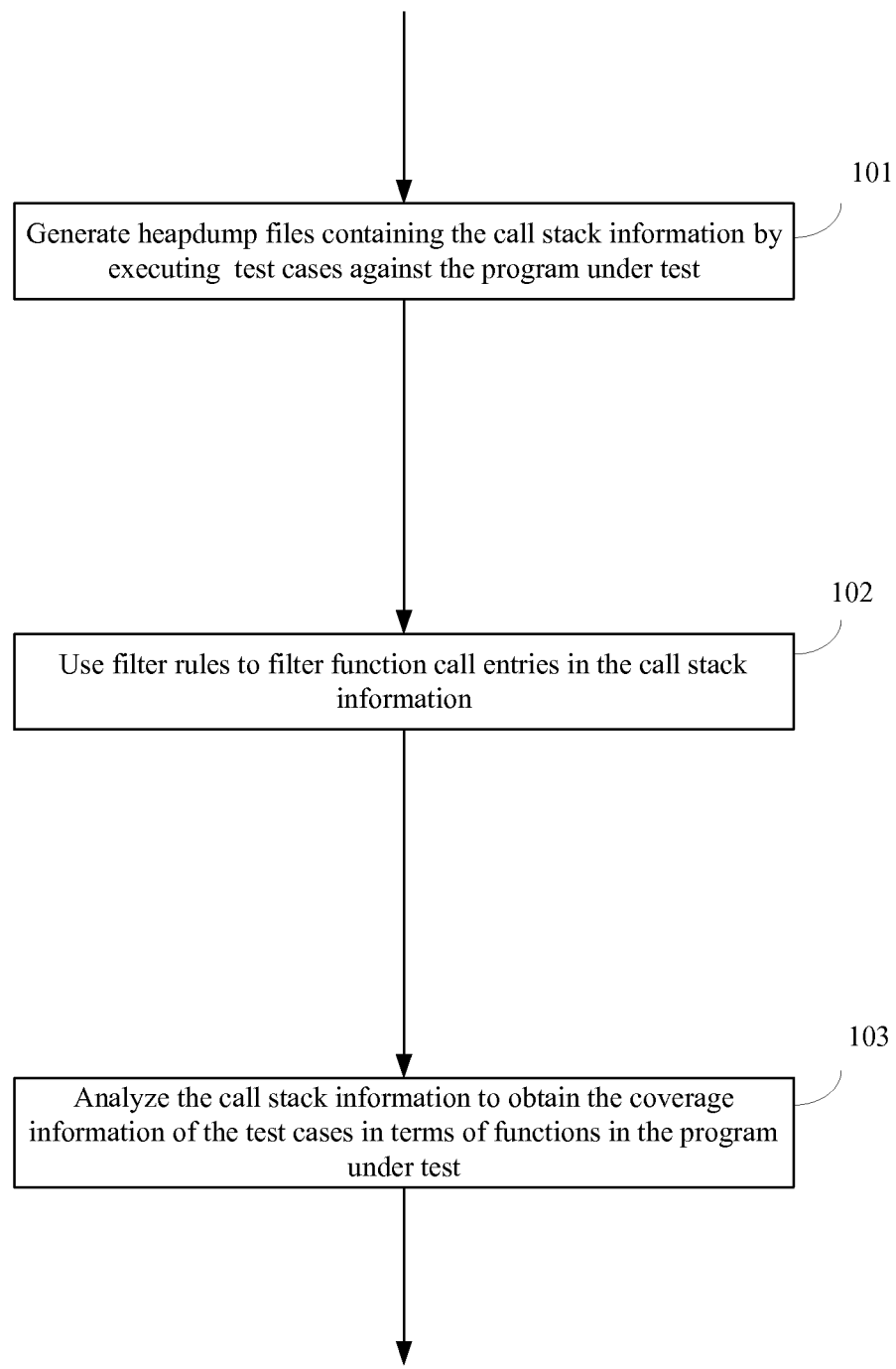
FIG. 1 shows a test coverage analysis method according to an embodiment of the invention.

In the following, embodiments of the invention will be described by referring to the drawings. The following description expounds many concrete details in order to make the invention be thoroughly understood. Yet it is apparent to those skilled in the art that the invention can be implemented without some of these concrete details. Furthermore, it should be understood that the invention is not limited to the described specific embodiments. On the contrary, it is contemplated to implement the invention using any combination of the features and elements described below, no matter whether they relate to different embodiments or not. Thus, the following aspects, features, embodiments and advantages only serve as an illustration, instead of elements or limitation of the attached claims, unless explicitly stated otherwise in the claims.

In the following taking the JAVA environment as an example to expound the technical solution of the invention, it should be pointed out, however, that the invention is not limited to the JAVA environment, but applicable to any execution environment in which heapdump files containing call stack information can be generated when a program is executed.

A call stack is a stack used for storing the information of active subroutines (i.e. function) during the execution of a computer program, and the active subroutines are those which have been called and have not yet finished execution and returned. Each execution thread of a program has a call stack. A call stack consists of stack frames, each of which corresponds to a called subroutine. Each stack frame stores the return address of the called subroutine so that the called subroutine can return to the calling subroutine after its execution, and normally further stores the parameter values passed from the calling subroutine to the called subroutine, as well as the local variables of the called subroutine. Each time a subroutine is called, a stack frame for the subroutine is formed in the call stack; when a subroutine calls another subroutine during its execution, there will form the latter subroutine's stack frame on the top of the former subroutine's stack frame in the call stack; and when the current subroutine (its stack frame is on the top of the call stack) finishes execution, its stack frame is pop out from the call stack. Therefore, the call stack at any time during the execution of the program reflects the subroutine calling path by this time in the program's execution. By obtaining and analyzing the call stack at each moment of in the program's execution, the whole execution history and calling history of the program can be understood.

There is a simple command line profiling tool built in the JAVA environment called Hprof, which is used for heap and CPU profiling. In fact, Hprof is a JAVA virtual machine native agent library, which can be dynamically loaded when the JAVA virtual machine starts up through a command line option "-Xrunhrof". For example, using the command line command as below:

JAVA-Xrunhprof: cpu=samples, depth=15 Testcase1
the Hprof tool can be enabled, which will generate a heapdump file after the program Testcase1's execution. Apart from the object dynamic allocation information in the JAVA heap, the heapdump file also includes all the call stack information generated during the program's execution. For example, the following shows an example of the call stack information contained in a heapdump file:
Trace 300649:
   java.net.Inet4AddressImpl.lookupAllHostAddr (Inet4AddressImpl.java:Unknown line)
   java.net.InetAddress$1.lookupAllHostAddr(InetAddress.java:873)
   java.net.InetAddress.getAddressFromNameService(InetAddress.java:1211)
   java.net.InetAddress.getLocalHost(InetAddress.java:1342)
   com.abc.mm.sdk.server.DKDatastoreICM.logon(DKDatastoreICM.java:2299)
   com.abc.mm.sdk.server.DKDatastoreICM.connect(DKDatastoreICM.java:2076)
   com.abc.mm.qa.cm.Connect.test(Connect.java:63)
   com.abc.mm.qa.common.TestRunner.runTest(TestRunner.java:27)
   com.abc.mm.qa.common.VU.run(VU.java:35)
   java.lang.Thread.run(Thread.java:799)
wherein, 300649 is the number of the call stack information, and can be taken as the unique identification of the call stack. The call stack information lists the information of each function call by the calling order in the call stack, and each function call entry contains the function's full name (class name and method name), the source file where the function is, as well as the line number when the function is called in parenthesis.

Because the call stack information of a heapdump file contains each function called by a test case during its execution, the call stack information can be used for analyzing the coverage of the one or more test cases in terms of functions of the program under test.

In the foregoing the principle of the invention has been described briefly, in the following will be described a test coverage analysis method of the invention with reference to the drawings.

FIG. 1 shows a test coverage analysis method according to an embodiment of the invention. As shown, the method comprises the following steps.

In step 101, by executing one or more test cases against the program under test, one or more heapdump files containing the call stack information arising in the execution of the program under test are generated.

According to an embodiment of the invention, the program under test is executed in the JAVA environment, and the heapdump files are generated by using a hprof tool built in the JAVA virtual machine. In this way, the heapdump files can be directly generated in the JAVA program testing environment without using a special tool.

An example of the call stack information contained in a heapdump file generated in this step is shown above.

According to an embodiment of the invention, the test coverage analysis method includes an optional step 102, in which filter rules are used to filter function call entries in the call stack information, to only retain the function call entries which are meaningful to function coverage analysis of test cases while filtering out those meaningless function call entries.

According to an embodiment of the invention, the filter rules can include a partial or full name of the program package under test, which is used for filtering out function call entries not including the partial or full name of the package. For example, if a filter rule specifies the name of the program package under test as 'com.abc.mm.sdk', all the function call entries not including 'com.abc.mm.sdk' will be filtered out from the function call stack information, and those including 'com.abc.mm.sdk' will be retained in the function call stack information for coverage analysis. The retained function call entries indicate calls of functions in the package under test, 'com.abc.mm.sdk', by test cases.

Besides, filter rules can also include the names of classes or methods unimportant to test coverage analysis, which is used for filtering out function call entries containing the classes or methods. For example, because methods 'com.abc.mm.sdk-.server.DKDatastoreICM.connect' and 'com.abc.mm.skd-.server.DKDatastoreICM.logon' are always executed by all test cases, they are inconducive to analyzing the coverage of test cases in terms of functions in the program under test, and thus entries including these methods can be filtered out from the call stack information.

The invention allows using any or both of the two filter rules above to filter function call entries in the call stack information.

In step 103, the call stack information in the one or more heapdump files is analyzed to obtain the coverage information of the one or more the test cases in terms of functions in the program under test. In other words, by analyzing each of the function call entries in the call stack information generated by the test cases, it is determined which functions in the program under test are called by the test cases, so as to obtain the coverage information of test cases in terms of functions in the program under test. In an embodiment of the invention comprising the filter step 102, analyzing the call stack information comprises analyzing function call entries in the filtered call stack information, to obtain the coverage of the one or more test cases in terms of functions in the program under test.

Figure 2:
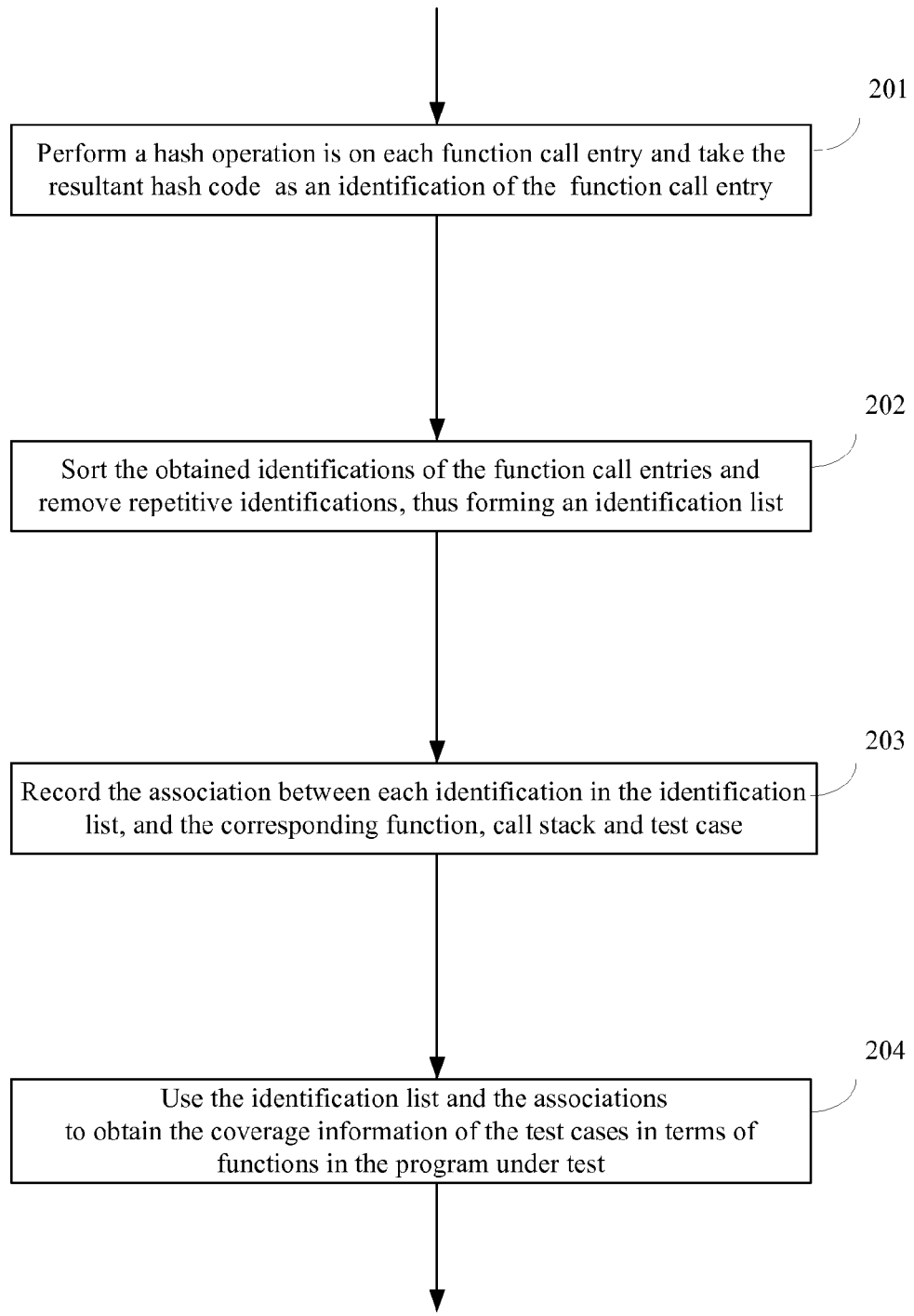
FIG. 2 shows a concrete implementation of analyzing function call entries in filtered call stack information to obtain the coverage of one or more test cases in terms of functions of the program under test according to an embodiment of the invention.

FIG. 2 shows a concrete implementation of analyzing function call entries in call stack information to obtain the coverage of one or more test cases in terms of functions in the program under test according to an embodiment of the invention, that is, concrete implementation steps included in step 103 mentioned above according to an embodiment of the invention. It should be pointed out that the concrete implementation is only illustration, instead of limitation to the invention. The invention can use any other method to analyze function call entries in the call stack information to obtain the coverage information of test cases in terms of functions in the program under test.

As shown in FIG. 2, according to an embodiment of the invention, the step of analyzing function call entries in the call stack information includes the following steps:

In step 201, a hash operation is performed on each function call entry and the resultant hash code is taken as an identification of the function call entry. Any one of many known hash algorithms in the field can be used to perform the hash operation, and the number of digits of the hash codes can be different. Preferably, the hash algorithm and the number of digits of the hash code should be such as to ensure different function call entries generate different hash codes as far as possible. The following shows an example of call stack information:

Trace 300586
    java.net.SocketInputStream.socketRead0(SocketInputStream.java:Unknown line)
    java.net.SocketInputStream.read(SocketInputStream.java:155)
    java.net.SocketInputStream.read(SocketInputStream.java:211)
    com.abc.mm.sdk.internal.PHttpResponse.readResponseHeaders(PHttpResponse.java:247)
    com.abc.mm.sdk.internal.PHttpResponse.retrieveHeadersFromResponse(PHttp Response.java:202)
    com.abc.mm.sdk.internal.PHttpResponse.getStatusCode(PHttpResponse.java:113)
    com.abc.mm.sdk.internal.PHttpURLConnection.getResponseCode(PHttpURLConnection.java:248)
    com.abc.mm.sdk.internal.PHttpPut.getHTTPResponse(PHttpPut.java:913)
    com.abc.mm.sdk.common.DKLobICM.storeOnObjectServer(DKLobICM.java:3115)
    com.abc.mm.sdk.common.DKLobICM.validatePrimaryRMForStoreOrReplace(DKLobICM.java:2916)

wherein, 'com.abc.mm.sdk.internal. PHttpResponse.retrieveHeadersFromResponse (PHttpResponse.java:202)' is a function call entry, and the hash code generated from the function call entry as its identification is 2042986671.

In step 202, the obtained identifications of the function call entries are sorted and repetitive identifications are removed, thus forming an identification list comprising a set of unique identifications.

In step 203, the association between each identification in the identification list, and the corresponding function, call stack and test case is recorded. For example, for the above exemplary identification −2042986671 included in the identification list, the association between the identification 2042986671 and the function 'com.abc.mm.sdk.internal.PHttpResponse.retrieveHeadersFromResponse', the call stack's identification 300586, as well as the test case Testcase1 which generates the call stack information can be recorded as. The association can be stored in a storage or a database. In an embodiment of the invention, the association between each identification in the identification list and the corresponding function, call stack and test case, can be obtained by, for each identification in the identification list, traversing the call stack information in all the heapdump files generated by all the test cases, and using the hash algorithm the same as that used for generating the identifications in the identification list to generate a hash value for each function call entry in each call stack information, and then comparing the hash value with the identification. Of course, the association between each identification in the identification list and the corresponding function, call stack and test case can also be obtained directly and recorded while generating each identification in the identification list.

In step 204, the coverage information of the one or more test cases in terms of functions in the program under test is obtained using the identification list and the associations.

By obtaining the hash value of each function call entry in the call stack information generated by each test case and sorting these hash values, it can be determined more quickly which functions in the program under test have been called by which test case, so that overage analysis of test cases can be performed more quickly and efficiently.

According to an embodiment of the invention, the coverage can comprise any one or more of the following: a specific function in the program under test is covered by which one or more test cases of the one or more test cases; which functions in the program under test are covered by a specific test case of the one or more test cases; and which one or some functions in the program under test are not covered by the one or more test cases.

For example, it can be determined according to the identification list and the associations that a specific function 'com.abc.mm.sdk.common.DKLobICM.storeOnObjectServer' is covered by the test cases Testcase1 and Testcase2, and contained in the call stack information with respective identifications 300654 and 300661 and generated by Testcase1 and Testcase2 respectively.

As another example, it can be determined according to the identification list and the associations that a specific test case covers functions 'com.abc.mm.sdk.internal.PHttpSocketHandler.connect', 'com.abc.mm.sdk. internal.PHttpURLConnection.connect', 'com.abc.mm.sdk.internal. PHttpURLConnection.<init>', 'com.abc.mm.sdk.internal.PHttpPut. createConnection', 'com.abc.mm.sdk.internal.PHttpPut.openConnection', etc. in the call stack information generated thereby.

As yet another example, it can be determined which functions in the program under test are not covered by test cases by comparing the list of all the functions in the program under test with the functions in all the function call entries included in all the call stack information generated by all the test cases.

Further, the obtained result on coverage can be stored in order to be further processed and displayed.

Above has been described a test coverage analysis method according to an embodiment of the invention, it should be pointed out that the above description is only an illustration, instead of limitation to the invention. In other embodiments of the invention, the method can have more less or different steps, and the relationships amongst the steps can be different from what is described. In addition, some steps can be divided into sub-steps, while some steps can be merged into a bigger step. For example, some embodiments of the invention can exclude any one or both of the filter step 102, and the sorting sub-steps, etc. All these variations are contemplated within the scope of the present invention.

Figure 3:
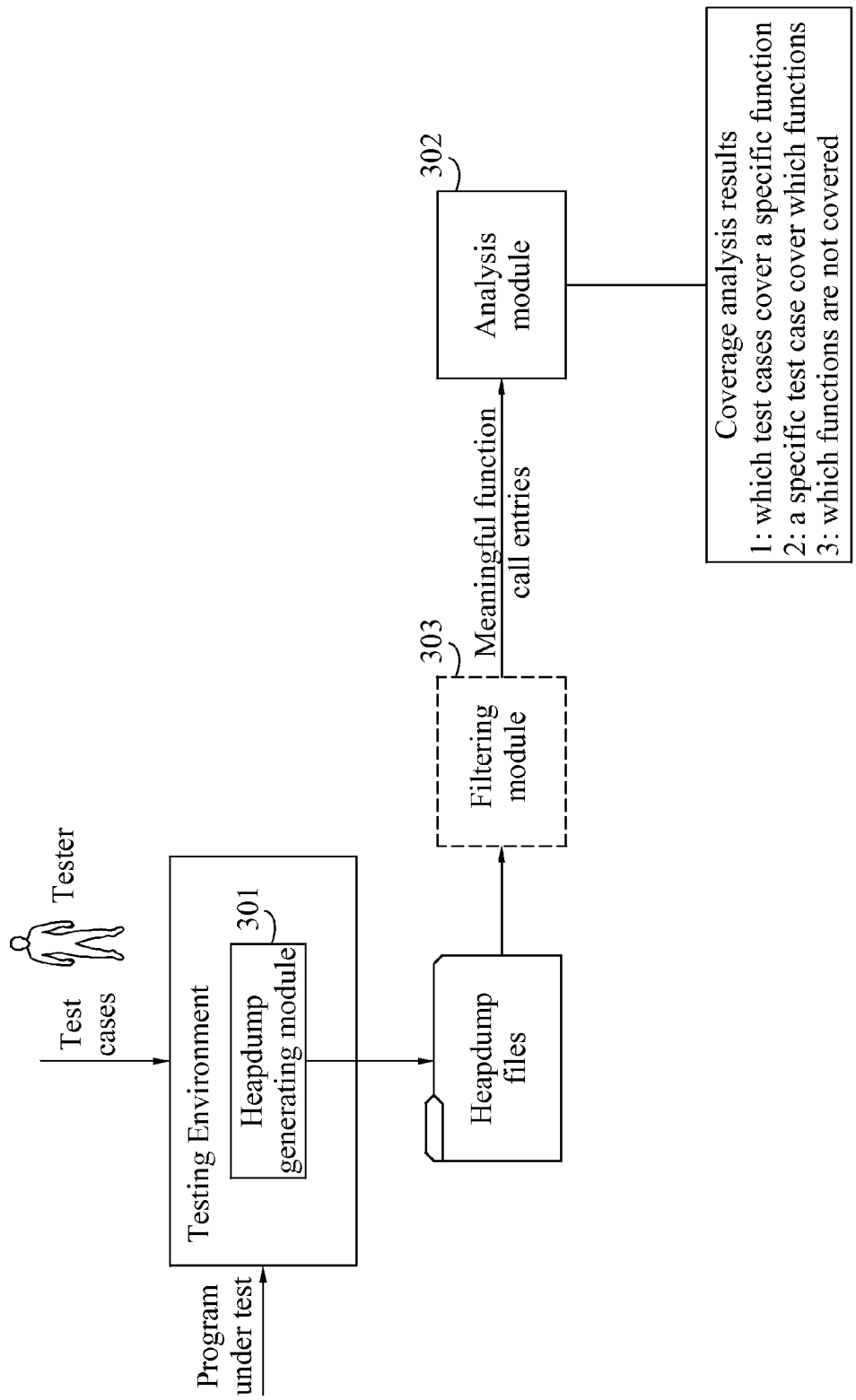
FIG. 3 shows a test coverage analysis apparatus according to an embodiment of the invention.

Next will be described a test coverage analysis apparatus according to an embodiment of the invention with reference to FIG. 3. For brevity, in the following description some content is omitted which is redundant with the above description, so reference can be made to the above description to learn the test coverage analysis apparatus of the invention in more detailed.

As shown in the figure, a test coverage analysis apparatus according to an embodiment of the invention comprises: a heapdump generation module 301 configured to, by executing a program under test using one or more test cases, generate one or more heapdump files containing the call stack information arising during the execution of the program under test; and an analysis module 302 configured to analyze the call stack information in the one or more heapdump files to obtain coverage of one or more the test cases in terms of functions in the program under test.

According to an embodiment of the invention, the program under test is executed in a JAVA environment, and the heapdump generation module 301 is an hprof tool built in a JAVA virtual machine. In this way, the heapdump files can be generated directly in a JAVA program testing environment without using a special tool.

According to an embodiment of the invention, the test coverage analysis apparatus further comprises a filtering module 303 configured to use filter rules to filter function call entries in the call stack information, and the analysis module 302 is further configured to analyze function call entries in the call stack information filtered.

According to a further embodiment of the invention, the filter rules comprise any one or more of the following: a partial or full name of the package containing the program under test, used for filtering out function call entries not including the partial or full name of the package; and the names of classes or methods unimportant to test coverage analysis, used for filtering out function call entries including the class or method.

Figure 4:
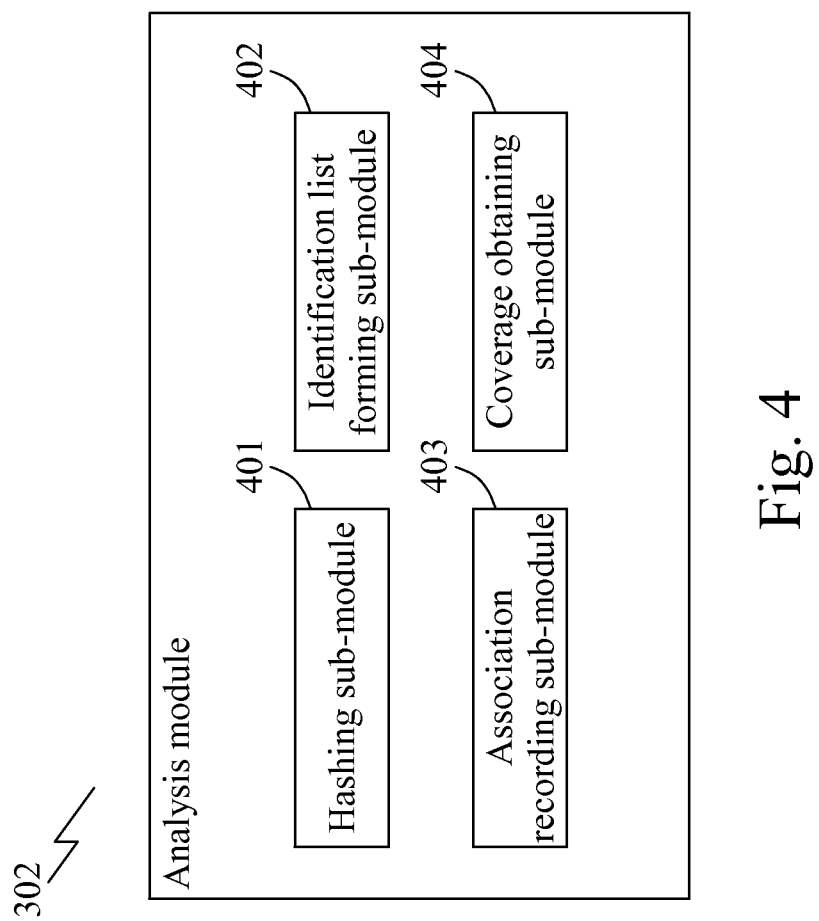
FIG. 4 shows the sub-module contained in the analysis module according to an embodiment of the invention.

FIG. 4 illustrates the sub-modules included in an analysis module 302 configured to analyze function call entries in the call stack information filtered according to an embodiment of the invention. As shown in the figure, the analysis module 302 comprises:

a hash sub-module 401 configured to perform a hash operation on each of the filtered function call entries, and take the obtained hash code as an identification of the function call entry;

an identification list forming sub-module 402 configured to sort the obtained identifications of the function call entries and remove repetitive identifications, thus forming an identification list;

an association recording sub-module 403 configured to record the association between each identification in the identification list and the corresponding function, call stack information and test case; and a coverage obtaining sub-module 404 configured to use the identification list and the associations to obtain the coverage of the one or more test cases in terms of functions in the program under test.

According to an embodiment of the invention, the coverage includes any one or more of the following: a specific function in the program under test is covered by which one or some test cases of the one or more test cases; which functions of the program under test are covered by a specific test case of the one or more test cases; and which one or more functions in the program under test are not covered by the one or more test cases.

Above having been described a test coverage analysis apparatus according to an embodiment of the invention, it should be pointed out that the above description is only an illustration instead of limitation to the invention. In other embodiments of the invention, the apparatus can have more, less or different modules, and the connections and containment relationships among the modules can be different from that is described. In addition, some modules can be divided into smaller modules and some can be merged into a larger module. For example, some embodiments of the invention can exclude the filtering module 302, and the identification list forming sub-module 304 can exclude the sorting function, and so on. All the variations are within the scope of the invention.

The invention can be realized in hardware, software or a combination thereof. The invention can be realized in a centralized manner in a single computer, or in a distributed manner, in which different components are distributed in several interconnected computer systems. Any computer system or other apparatus suitable for executing the method described herein is available. A typical combination of hardware and software may be a general-purpose computer system with a computer program, which when being loaded and executed, controls the computer system to execute the method of the invention, and constitute the apparatus of the invention.

The invention also can be embodied in a computer program product, which contains all the features enabling to the realization of the method described herein, and when being loaded into a computer system, can execute the method.

Although the invention has been illustrated and described in detail by referring to preferred embodiments, those skilled in the art should understand that various changes may be made thereto both in form and detail, without departing from the spirit and scope of the invention.

The invention claimed is:

1. A test coverage analysis method, comprising:
executing a program under test using one or more test cases;
generating one or more heapdump files containing a call stack information of the program under test;
analyzing the call stack information in the one or more heapdump files to obtain the coverage information of the one or more the test cases; and
filtering function call entries in the call stack information by using filter rules, wherein the filter rules comprise one or more of the following:
a partial or full name of a package containing the program under test, used for filtering out the function call entries which do not contain the partial or full name of the package; and
a name of a class or method, which is not required to test coverage analysis, used for filtering out the function call entries containing the class or method.

2. The method according to claim 1, wherein the coverage includes any one or more of the following:
a specific function in the program under test is covered by at least one of the one or more test cases;
particular functions in the program under test are covered by a specific test case from the one or more test cases; and
one or more functions in the program under test are not covered by the one or more test cases.

3. The method of claim 1, wherein analyzing the call stack information comprises analyzing one or more function call entries in the call stack information filtered.

4. The method according to claim 1, wherein analyzing function call entries in the call stack information filtered comprises:
performing a hash operation on each of the function call entries filtered, and taking the obtained hash code as an identification of the function call entry;
sorting the obtained identifications of function call entries and removing repetitive identifications, thus forming an identification list;
recording an association between each identification in the identification list and the corresponding function call stack and test case; and
using the identification list and associations to obtain the coverage information of the one or more test cases in terms of functions of the program under test.

5. A test coverage analysis apparatus, comprising:
at least one processor, wherein the at least one processor includes:
  a heapdump generation module configured to generate one or more heapdump files containing call stack information of a program under test by executing the program under test using one or more test cases;
  an analysis module configured to analyze the call stack information in the one or more heapdump files to obtain coverage information of one or more the test cases in terms of functions in the program under test; and
  a filtering module configured to use filter rules to filter function call entries in the call stack information, wherein
the analysis module is further configured to analyze function call entries in the call stack information filtered
the filter rules comprise one or more of the following:
  a partial or full name of a package containing the program under test, used for filtering out the function call entries which do not include the partial or full name of the package; and
  a name of a class or method, which is not required to test coverage, used for filtering out the function call entries including the class or method.

6. The apparatus according to claim 5, wherein the coverage information comprises one or more of the following:
  a specific function in the program under test is covered by certain of the test cases;
  which functions of the program under test are covered by a specific test case in the one or more test cases; and
  which one or more functions of the program under test are not covered by the one or more test cases.

7. The apparatus according to claim 5, wherein the analysis module configured to analyze function call entries in the call stack information filtered comprises:
  a hash module configured to perform a hash operation on each of the function call entries filtered and take the obtained hash code as an identification of the function call entry;
  an identification list forming module configured to sort the obtained identifications of function call entries and remove the repetitive identifications, thus forming an identification list;
  a recording module configured to record the association between each identification in the identification list and the corresponding function, call stack and test case; and
  a coverage obtaining module configured to use the identification list and the associations to obtain the coverage information of the one or more test cases in terms of functions in the program under test.

* * * * *